United States Patent
Wang et al.

(10) Patent No.: US 6,727,866 B2
(45) Date of Patent: Apr. 27, 2004

(54) PARALLAX BARRIER TYPE AUTOSTEREOSCOPIC DISPLAY DEVICE

(75) Inventors: Nai-Yueh Wang, Ma-Kung (TW); Hseng-Jen Lee, Chang-Hua Hsien (TW); Chao-Hsu Tsai, Hsin-Chu (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 293 days.

(21) Appl. No.: 09/962,319

(22) Filed: Sep. 26, 2001

(65) Prior Publication Data

US 2002/0180660 A1 Dec. 5, 2002

(30) Foreign Application Priority Data

May 31, 2001 (TW) ........................................ 90113436 A

(51) Int. Cl.[7] .................................................. B09G 5/00
(52) U.S. Cl. .............................. 345/7; 348/51; 359/462
(58) Field of Search ............................... 345/7, 8, 9, 87, 345/102; 348/51, 52, 53, 58, 56, 59; 359/462, 463, 464, 465, 466, 467, 468, 469, 472

(56) References Cited

U.S. PATENT DOCUMENTS

| | | | | |
|---|---|---|---|---|
| 5,392,140 A | * | 2/1995 | Ezra et al. ..................... 349/15 |
| 5,465,175 A | * | 11/1995 | Woodgate et al. ........... 359/463 |
| 5,777,720 A | * | 7/1998 | Shapiro et al. .............. 351/237 |
| 5,808,792 A | * | 9/1998 | Woodgate et al. ........... 359/463 |
| 5,861,931 A | * | 1/1999 | Gillian et al. ................ 349/129 |
| 6,014,164 A | * | 1/2000 | Woodgate et al. ............. 348/51 |
| 6,049,424 A | * | 4/2000 | Hamagishi ................... 359/464 |
| 6,172,807 B1 | * | 1/2001 | Akamatsu .................... 359/462 |
| 6,304,288 B1 | * | 10/2001 | Hamagishi .................... 348/53 |
| 6,377,295 B1 | * | 4/2002 | Woodgate et al. ............. 348/59 |

* cited by examiner

*Primary Examiner*—Xiao Wu
(74) *Attorney, Agent, or Firm*—Bacon & Thomas, PLLC

(57) ABSTRACT

A parallax barrier type autostereoscopic display device consists of a light source formed by one or more pairs of horizontal and parallel strip light source, an image forming device located in front of the light source for forming light source image to viewer' left eye position and right eye position, a transmissive light modulation panel located at one side of the image forming device opposite to the light source for displaying the left eye image and the right eye image thereon visible respectively to viewer' left eye and right eye, and a horizontal parallax barrier located between the image forming device and the transmissive light modulation panel.

12 Claims, 4 Drawing Sheets

PARALLAX BARRIER TYPE AUTOSTEREOSCOPIC DISPLAY DEVICE

FIELD OF THE INVENTION

The present invention relates to a three-dimensional (3D) display device capable of allowing viewers viewing 3D images without wearing any special glasses and particularly a 3D display device that employs horizontal and parallel strip light sources, an image forming device, a horizontal parallax barrier, and a transmissive light modulation panel to form images on the left and right eyes of viewers for the viewers to see 3D images.

BACKGROUND OF THE INVENTION

Presently, developments of 3D display devices are heavily focusing on the function and features such as high resolution, low ghost images, multiple viewing zones and viewing without using special glasses. The naked-eye type 3D display devices which include vertical parallax barriers now commercially available can display pictures with low ghost images. However they do not have smooth multiple viewers tracking function.

FIG. 1 illustrates a 3D display method which adapts a conventional technique. On the LCD device 1, there is a vertical parallax barrier 21 to separate the images of the left eye and right eye to achieve the 3D effect. The parallax barrier 21 matches the pixel pitch of the LCD device 1 to allow viewers to see two separated images from two eyes at a selected distance. Whereas, viewers have to fix the eyes to a correct position to see the correct 3D images. Otherwise viewers' two eyes will perceive ghost images or reversed stereo images. If an eye tracking device is coupled to the display device, when the images are reversed, the images on the two eyes may be switched, then viewers may still see the correct 3D images. However when viewers' eyes are between the correct and the reverse-stereo positions, the image crosstalk between the two eyes will still happen. U.S. Pat. No. 6,049,424 discloses a technique which uses liquid crystal to change the shape and position of the parallax barrier. But the resolution of the parallax barrier formed by liquid crystal is limited. It also cannot achieve smooth tracking effect. And the offering tracking function is applicable only to a viewer.

Taiwan Patent No. 381394 discloses a smooth tracking naked-eye 3D display device which uses a horizontal microretarder to couple polarization changes of a light source to offer tracking for multiple viewers. However the retarder material functions differently to light of different wavelengths. It tends to generate ghost images between the images on two eyes. Moreover, the machining of the microretarder forms a transition area between different areas of different retardation states which induces crosstalk and in turn causes ghost images.

SUMMARY OF THE INVENTION

The primary object of the present invention is to resolve the foregoing disadvantages. The invention provides a parallax barrier type autostereoscopic display device which allows viewers being smoothly tracked when viewing.

Another object of the invention is to provide a parallax barrier type autostereoscopic display device that is capable of performing tracking for multiple viewers.

A further object of the invention is to provide a parallax barrier type autostereoscopic display device that is capable of reducing ghost images.

To attain the foregoing objects, the invention consists of a light source which is composed of one or more pairs of horizontal and parallel strip light sources, an image forming device located in front of the light source, a transmissive light modulation panel disposed at a selected location at one side of the image forming device opposite to the light source, and a horizontal parallax barrier located between the image forming device and the transmissive light modulation panel. The device thus constructed allows multiple viewers being smoothly tracked during viewing and can also reduce ghost images.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
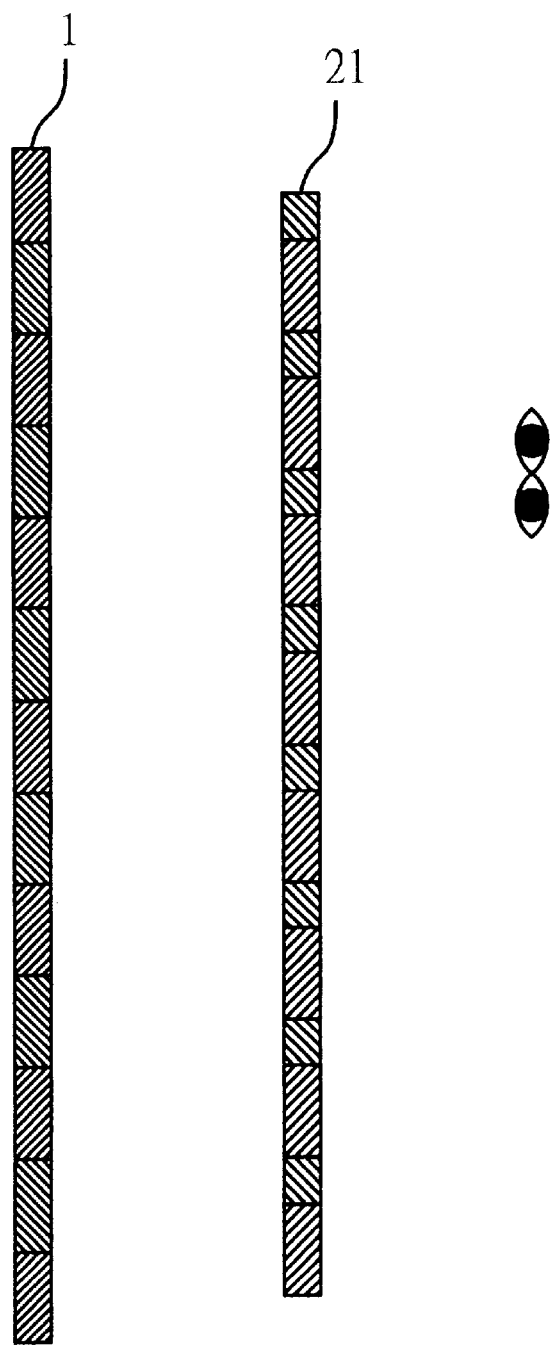
FIG. 1 is a schematic view of a conventional 3D display technique.
Figure 2:
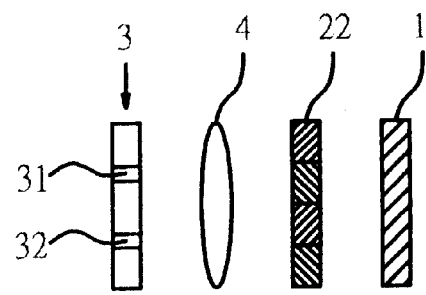
FIG. 2 is a schematic side view of the basic structure of the present invention.

Referring to FIG. 2, the basic structure of the present invention includes a light source 3, an image forming device 4, a horizontal parallax barrier 22 and a transmissive light modulation panel 1. The light source 3 is composed of one or more pairs of horizontal and parallel upper strip light sources 31 and lower strip light sources 32 which may be a projection type point array source, or a vertical straight and elongated lamp tube. An image forming device 4 of a field lens is located in front of the light source 3. The image forming device 4 of a field lens may be a fresnel lens, a conventional lens, or a lens array for forming the light source image at the positions of the viewers' left eye and right eye to allow the left eyes and right eyes of the viewers to see respectively the left eye image and right eye image on the LCD panel. A transmissive light modulation panel 1 is disposed at a selected location at one side of the image forming device 4 opposite to the light source 3. The horizontal parallax barrier 22 is located between the image forming device 4 and the transmissive light modulation panel 1.

Figure 3:
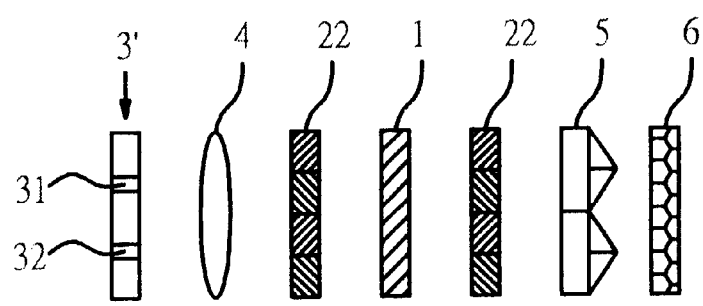
FIG. 3 is a schematic view of the present invention in use.

As shown in FIG. 3, when in use, the light source 3 is coupled to a viewer eye tracking device to form a tracking type light source 3'. Further, a microprism plate 5 is located in front of the transmissive light modulation panel 1 and the a vertical light diffusion plate 6 is located in front of the microprism plate 5. The vertical light diffusion plate 6, a device diffusing the light only in vertical direction, may be a miniature cylindrical surface lens array or a diffraction optical element. An additional horizontal parallax barrier 22 may also be added between the transmissive light modulation panel 1 and the microprism plate 5 at a selected interval.

Figure 4:
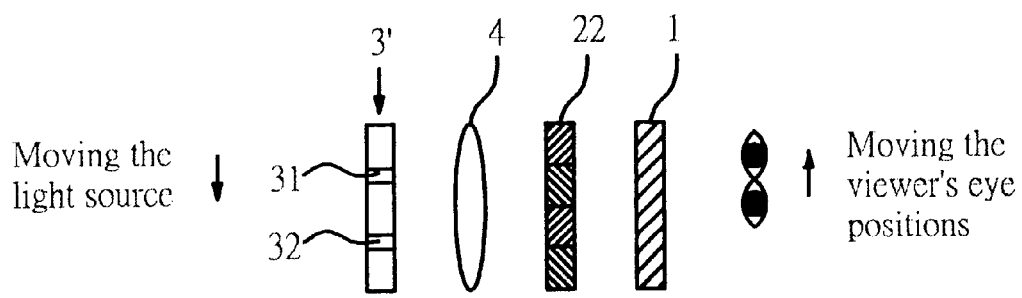
FIG. 4 is a schematic view of moving light source to change viewing scope position.

FIG. 4 depicts the present invention to change viewing scope positions by moving the light source. Employing the image forming characteristics of the field lens, two light sources on the same plane may form images on the image plane of the field lens. The positions of the light sources are corresponding to the positions of viewers' eyes on the image plane. The two light sources provide the illuminance for the images seen by the left eye and right eye respectively. When viewers' eye positions are moved, the turn-on positions of the light sources shall also be moved relatively to make the image forming positions matching viewers' eye positions.

Figure 5A:
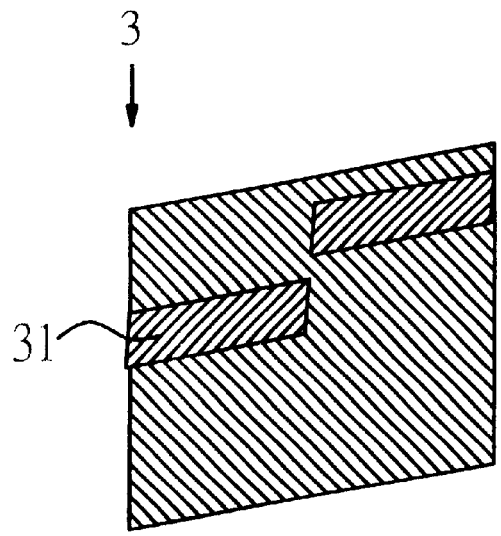
FIG. 5a is a schematic view of a light source for a viewer.
Figure 5B:
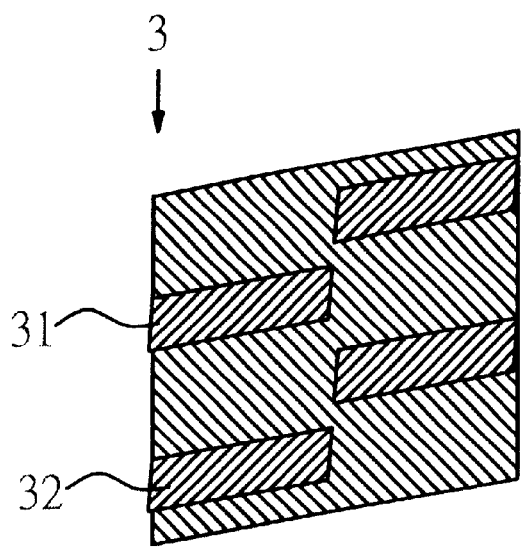
FIG. 5b is a schematic view of a reinforced light source for a viewer.

FIGS. 5a and 5b illustrate respectively a light source for a viewer and a reinforced light source for a viewer according to the present invention. The shape of the light source may be repeated by cycle to increase the brightness of the image perceived by the viewer.

Figure 6A:
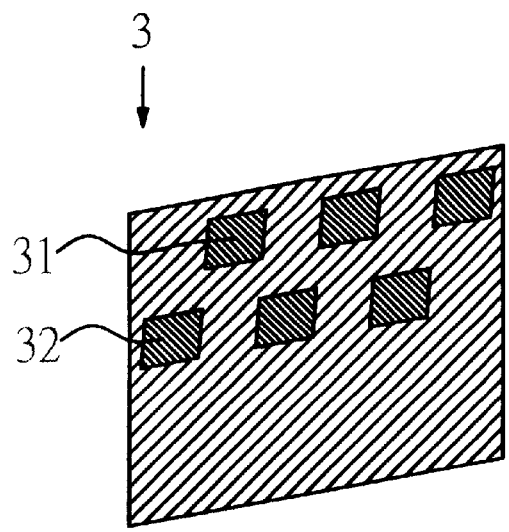
FIG. 6a is a schematic view of a light source for multiple viewers.
Figure 6B:
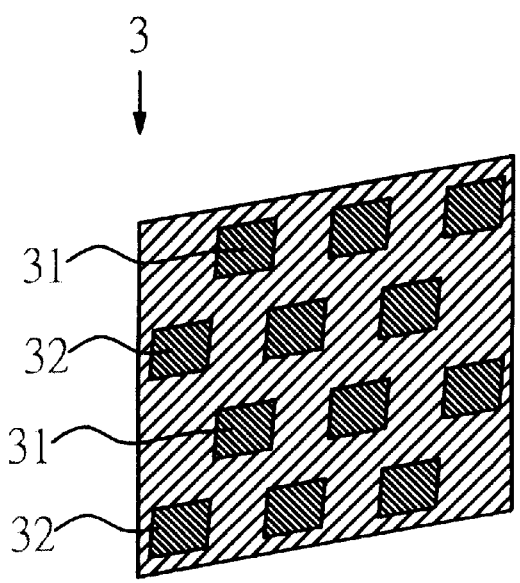
FIG. 6b is a schematic view of a reinforced light source for multiple viewers.

FIGS. 6a and 6b illustrate respectively a light source for multiple viewers and a reinforced light source for multiple viewers according to the present invention. The shown drawings are for an example of three viewers. When the eye positions of any viewer move, the turn-on position of the sets of the light sources will move independently and relatively corresponding to the moving positions of viewers' eyes. And image brightness may be increased through changing the number of rows of the light sources.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

What is claimed is:

1. A parallax barrier type autostereoscopic display device, comprising:

a light source including one or more pairs of horizontal and parallel strip sources;

an image forming device located in front of the light source for forming the light source image at the positions of a viewer's left eye and right eye to allow the left eyes and right eyes of viewers to see respectively a left eye image and right eye image on a transmissive light modulation panel located at one side of the image forming device opposite to the light source; and a horizontal parallax barrier having bands extending in a horizontal direction located between the image forming device and the transmissive light modulation panel.

2. The parallax barrier type autostereoscopic display device of claim 1 further having a tracking device coupled to the strip light source.

3. The parallax barrier type autostereoscopic display device of claim 1, wherein the strip light source is a projection type point array light source.

4. The parallax barrier type autostereoscopic display device of claim 1, wherein the strip light source is a vertical straight and elongated lamp tube.

5. The parallax barrier type autostereoscopic display device of claim 1, wherein the image forming device is selected from a fresnel lens, a conventional lens, or a lens array.

6. The parallax barrier type autostereoscopic display device of claim 1, wherein the transmissive light modulation panel is a transparent liquid crystal display panel.

7. The parallax barrier type autostereoscopic display device of claim 1 further having a microprism plate located in front of the transmissive light modulation panel.

8. The parallax barrier type autostereoscopic display device of claim 7 further having another horizontal parallax barrier located between the transmissive light modulation panel and the microprism plate.

9. The parallax barrier type autostereoscopic display device of claim 7, wherein the microprism plate has a pitch about twice of the pixel vertical height of the transmissive light modulation panel.

10. The parallax barrier type autostereoscopic display device of claim 7 further having a vertical light diffusion plate located in front of the microprism plate.

11. The parallax barrier type autostereoscopic display device of claim 9, wherein the vertical light diffusion plate is a miniature cylindrical surface lens array.

12. The parallax barrier type autostereoscopic display device of claim 9, wherein the vertical light diffusion plate is a diffraction optical element.

* * * * *